United States Patent [19]

Wall, Jr.

[11] Patent Number: 5,287,351
[45] Date of Patent: Feb. 15, 1994

[54] METHOD AND APPARATUS FOR MINIMIZING ERROR PROPAGATION IN CORRELATIVE DIGITAL AND COMMUNICATION SYSTEM

[75] Inventor: William E. Wall, Jr., Atlanta, Ga.

[73] Assignee: Scientific-Atlanta, Inc., Norcross, Ga.

[21] Appl. No.: 851,588

[22] Filed: Mar. 16, 1992

Related U.S. Application Data

[63] Continuation-in-part of Ser. No. 618,744, Nov. 27, 1990, Pat. No. 5,239,540.

[51] Int. Cl.$^5$ ............................................... H04J 3/00
[52] U.S. Cl. ........................................ 370/77; 370/20; 375/39
[58] Field of Search .............. 370/77, 20, 73; 375/39, 375/57; 455/60; 381/15

[56] References Cited

U.S. PATENT DOCUMENTS

| | | | |
|---|---|---|---|
| 4,484,337 | 11/1984 | Leclert et al. | 375/81 |
| 4,648,100 | 3/1987 | Mardirosian | 375/86 |
| 4,665,532 | 5/1987 | Fukuda et al. | 455/60 |
| 4,687,999 | 8/1987 | Desperben et al. | 329/109 |
| 4,821,261 | 5/1989 | Pommier | 370/20 |
| 4,959,844 | 9/1990 | Walp | 375/39 |
| 5,022,053 | 6/1991 | Chung et al. | 375/39 |
| 5,150,384 | 9/1992 | Cahill | 375/97 |

OTHER PUBLICATIONS

Pasupathy, Subbarayan, "Correlative Coding: An Bandwidth-Efficient Signaling Scheme," *IEE Communications Society Magazine*, Jul. 1977 (pp. 4-11), describes partial response coding for digital signals.
Anderson, Carl and Steve Barber, "Modulation: The Key to Effective Bandwidth Utilization," *Telesis*, Dec. 1977 (pp. 172-179), relates to different digital coding schemes including quadrature partial response.
Montreuil, Leo and William Wall, "Performance of Digital Modulation Methods in Cable Systems," compares the performance of several modulation schemes in a CATV system.
"Subcarrier Phase Referencing," *Frequency Acquisition, Phase Referencing, and Timing.* (pp. 421-432). discloses several demodulation techniques for PSK modulation including a Costas phase referencing method (FIG. 9.14).

*Primary Examiner*—Douglas W. Olms
*Assistant Examiner*—Shick Hom
*Attorney, Agent, or Firm*—Frederick W. Powers, III

[57] ABSTRACT

A digital audio communication system includes a digital modulation and demodulation scheme which efficiently uses the bandwidth and channel spacing of a cable television system. A 30 channel digital bit stream is demultiplexed into six groups of five channels. Each group of channels thereafter modulates a carrier by a quadrature partial response (QPR) process. The QPR signal, an amplitude modulated, double sideband, carrier suppressed (AM DSBSC) signal, is then transmitted over the cable system to a multiplicity of subscribers, each of which has a QPR demodulator. The demodulators are of the decision feedback type having a modified Costas loop carrier recovery circuit. The grouping of an odd number (five) of digital audio channels per QPR modulator minimizes error propagation due to the correlative QPR demodulation process. The decision feedback decoding is implemented in simple current nodes where a bilevel output from the decoded data is subtracted from a tertiary level output of a mixer. The resulting bilevel current is converted to a voltage, filtered, and limited to produce a logic output level. The modified Costas loop provides an error voltage based upon the difference of the received data states versus the nominal data states and the quadrant the data occupies. The error voltage is generated by differencing the outputs of two analog switches which have as their inputs analog signals representative of the amplitude level of the data and its inverse of one phase. The sign of the data bit of the opposite phase is used to control the switch and thus select which signal is used.

5 Claims, 11 Drawing Sheets

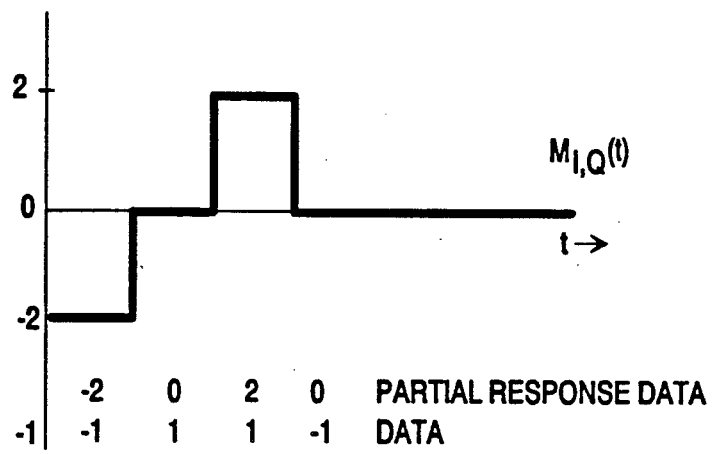
FIG 3
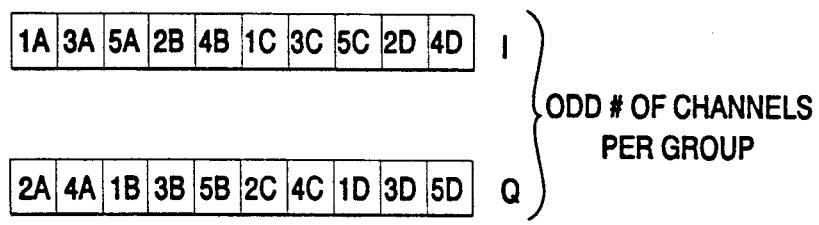
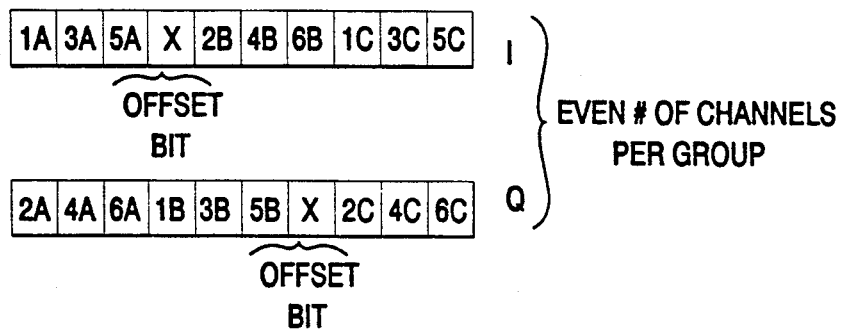
FIG 4

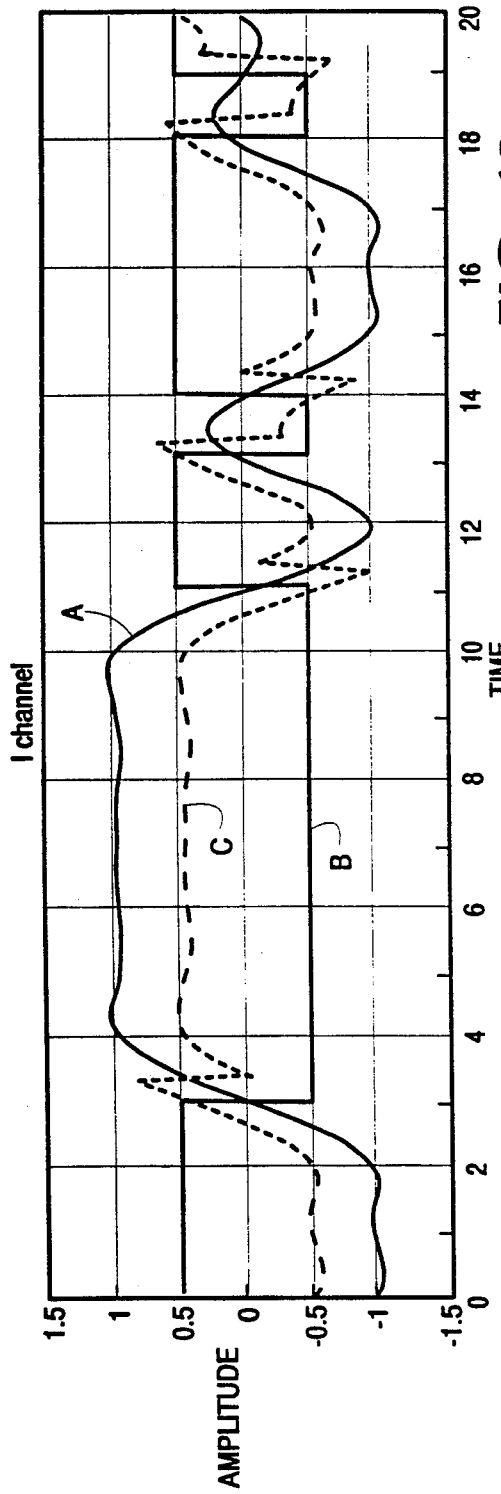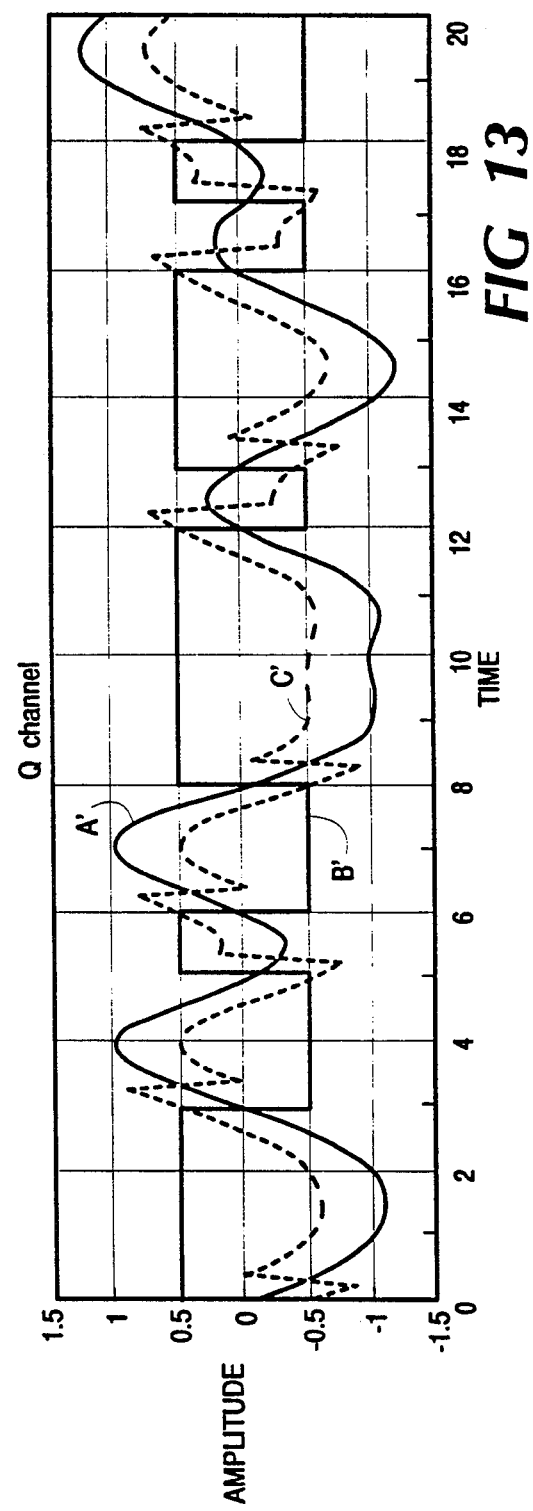

METHOD AND APPARATUS FOR MINIMIZING ERROR PROPAGATION IN CORRELATIVE DIGITAL AND COMMUNICATION SYSTEM

CROSS REFERENCE TO RELATED APPLICATIONS

The present application is a continuation-in-part of U.S. application Ser. No. 07/618,744 and now U.S. Pat. No. 5,239,540 entitled, "Method and Apparatus For Transmitting, Receiving and communicating Program data signals with digital data signals", filed Nov. 27, 1990, in the names of L. Rovira, et al. which is commonly assigned. The disclosure of Rovira, et al. is hereby incorporated by reference herein.

BACKGROUND OF THE INVENTION

The invention pertains generally to a quadrature partial response communication system and is more particularly directed to a quadrature partial response demodulator having increased demodulating efficiencies.

Quadrature partial response communication systems are known in the art for transmitting digital data over transmission links. The QPR communication systems usually comprise a QPR modulator which modulates digital information into a form which can be transmitted over the transmission link to a QPR demodulator where the digital information is recovered.

The modulation process which is termed quadrature partial response (QPR) is a combination of techniques. Partial response refers to the process of digital communications where a predetermined amount of one symbol affects the next symbol. One particular partial response communications process for transmitting binary numbers is duobinary where three levels (positive and negative levels about a zero reference) are formed. The scheme is robust and provides a high bit rate transfer with a low bandwidth. When phase modulated on a carrier a duobinary signal can be combined in quadrature (90° out of phase) with another similarly modulated duobinary signal. This quadrature modulation retains the efficient bandwidth of the duobinary signal while doubling the bit rate.

One of the more elegant schemes of duobinary is to have:

$$y_k = X_k + X_{k-1}$$

where $y_k$ is the encoded value of a symbol at time k and is found by taking the present symbol value $X_k$ at time k and adding to it the symbol value $X_{k-1}$, one symbol period earlier. If the input data stream is binary having elements $\{-1, 1\}$, then the output data stream is tertiary having elements $\{2, 0, -2\}$. Conversely, if $Y_k$ is the encoded symbol transmitted by the communication system, then:

$$X_k = y_k - X_{k-1}$$

where $X_k$ is the decoded symbol value and the difference $y_k - X_{k-1}$ is the present encoded value minus the previous decoded value.

From the above decoding algorithm for duobinary it is evident that the demodulator is correlative, i.e., the process of decoding a transmitted bit value $y_k$ requires the knowledge of the previous bit value $X_{k-1}$. While this provides many benefits, the correlation may cause errors to propagate from one bit to the next. The probability of an error propagating from one bit to the next bit is $\frac{1}{2}$ and the probability of an error propagating through a number of multiplexed channels is related to the spacing between bits of an individual channel. By multiplexing even a small number of channels together, the probability of an error propagating in any one channel can be made very small, for example, in six channels the probability becomes $\frac{1}{2}^6$. However, when QPR modulation takes place there is a demultiplexing of channels into the I and Q phases which for an even number of channels removes much of the error protection of the original multiplexing. In a normal six channel QPR communication system half the channels are demultiplexed into one phase and the other half into the other phase of the QPR signal. This increases the error propagation probability dramatically to $\frac{1}{2}^3$. It would, therefore, be extremely advantageous to provide a multiplexed QPR communication system which provided the advantages of QPR modulation while it retained the benefits of maximum channel bit separation to reduce error propagation probability.

A preferred technique for demodulating QPR modulated information is the decision feedback circuit. In the decision feedback demodulating scheme, an amplitude modulated partial response signal is input to a mixer and multiplied by a carrier which is coherent with the modulated data carrier. The signal is then split into two channels I and Q in which decision feedback circuits can be used to demodulate the digital data contained therein. Many of these decision feedback demodulators are extremely complex and do not provide precision decoding without undue expense. What is needed is a decision feedback demodulator for a quadrature partial response signal which is simple and inexpensive, but which accurately performs the demodulation and decoding of the information on the QPR signal.

The coherent demodulation carrier of a quadrature partial response signal can be recovered or extracted by a number of different circuits but one of the more elegant methods for the generation of such carrier is the Costas cross over loop. The implementation of the Costas loop is problematic because it is normally necessary to use expensive multipliers which additionally require precision gain control through the loop. This requirement makes the circuit much more complex than it should be to phase lock the demodulation carrier to the carrier of the QPR signal. What is needed is a carrier extraction circuit for a decision feedback demodulator of a QPR signal which is simple and inexpensive but accurately performs the extraction of a demodulation carrier which is coherent with the QPR carrier.

SUMMARY OF THE INVENTION

The invention provides an improved QPR communication system which reduces the probability of error propagation. In the preferred embodiment a multiplexed digital bit stream having a plurality of channels is demultiplexed into smaller groups before being QPR modulated. The bits of each group are then alternately demultiplexed into independent I and Q phases for encoding and modulation by a QPR process. The bits are grouped such that maximum channel bit separation is maintained in the independent I and Q channels.

In one preferred implementation maximum channel bit separation is provided by assigning an odd number of channels to each group.

In another preferred implementation maximum channel bit separation is provided by assigning an even number of channels to each group and inserting an offset bit in the I or Q data stream after each sequence of bits from all channels.

BRIEF DESCRIPTION OF THE DRAWINGS

These and other features, objects, and aspects of the invention will be more clearly understood and fully described if a reading, of the following detailed description is undertaken in/conjunction with the drawings wherein:

FIG. 3 is a pictorial representation of the partial response encoding of a bit stream for one phase of the QPR signal;

FIG. 4 is a pictorial representation of the digital audio channel demultiplexing of a bit stream prior to encoding in QPR format;

FIGS. 12 and 13 are pictorial representations of waveforms for the I and Q phases of the demodulation process illustrating the current combination process of the demodulator shown in FIG. 11;

DETAILED DESCRIPTION OF THE PREFERRED EMBODIMENT

Figure 1:
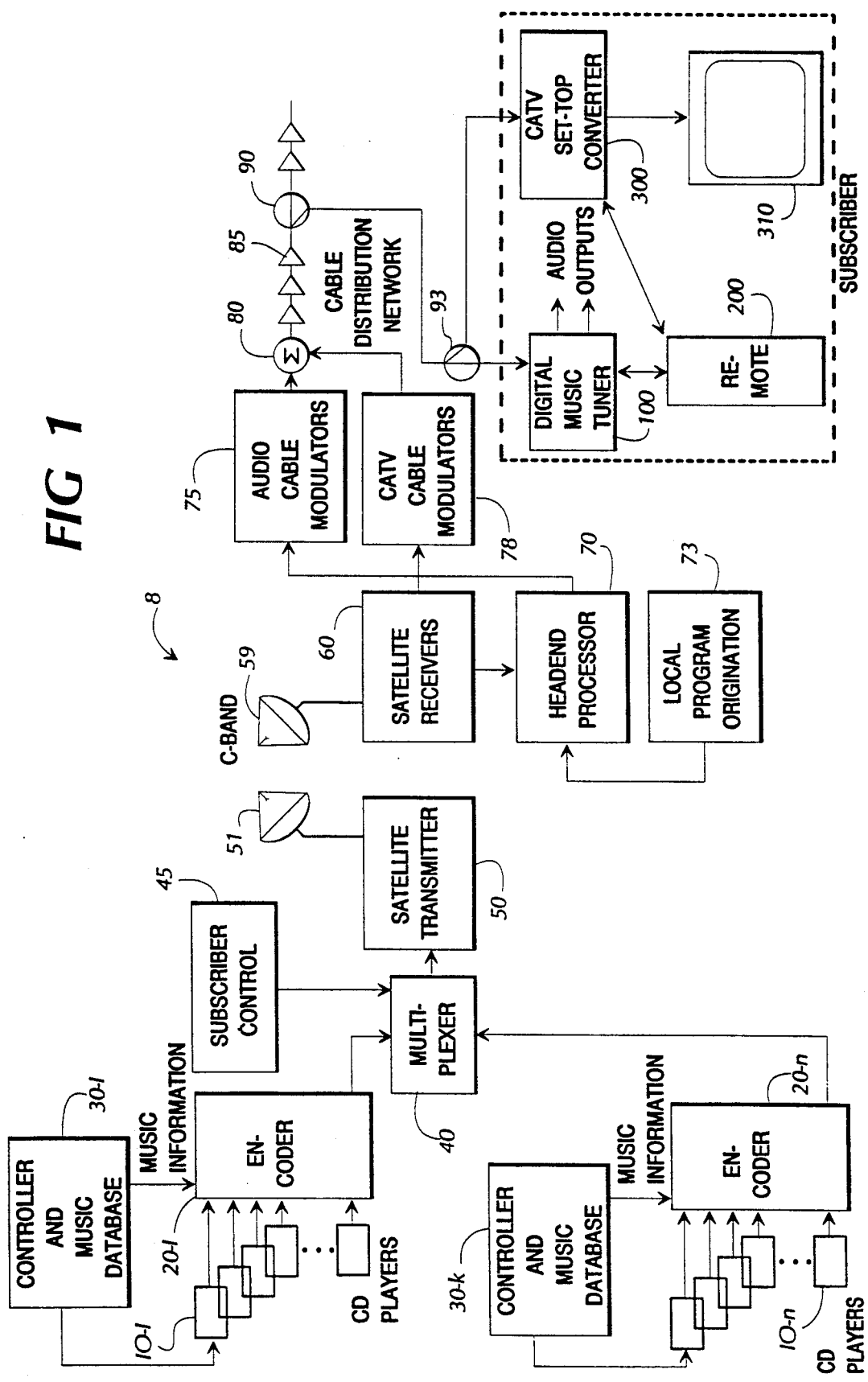
FIG. 1 is a system block diagram of a digital audio communication system constructed in accordance with the invention.

Referring to FIG. 1, a block diagram of an overall digital audio communication system 8 in which the present invention is used will be described. The system 8 illustrated provides for the communication of digital audio programs over a cable system. Compact disc players 10-1 through 10-n provide a plurality of digital audio signals for the system. These CD players may be the so called "jukebox" type wherein up to sixty or more compact discs may be stored and accessible by the player.

The digital audio signals from CD players 10-1 through 10-n are input to encoders 20-1 through 20-n which encode the data in a specialized digital format. Controllers and music databases 30-1 through 30-k control the output of CD players 10-1 through 10-n and any respective selection of compact discs within these players and also provide a database containing program data with a one to one correspondence to the tracks contained on the compact discs. Preferably, this program data includes title, track, artist, publisher, composer, song identification and play time information blocks for each song contained on a compact disc.

The plurality of digital audio signals input by the CD players 10-1 through 10-n are combined in the encoders 20-1 through 20-n with the corresponding program data signals input by controllers and music databases 30-1 through 30-k. The combined signals from encoders 20-1 through 20-n are then input to a multiplexer 40 which combines the signals into a serial digital data stream. The system in this manner provides 30 digital audio channels in a multiplexed data stream.

Additional signals may be combined with the digital audio and program information signals. Subscriber control 45 contains information on various subscribers who may receive the digital audio data. This subscriber information stored in subscriber control 45 is multiplexed with the digital audio and program data signals in multiplexer 40, producing a serial digital data stream containing digital audio, program information, and national subscriber information.

More particularly, outputs from CD players 10-1 through 10-n are input to the multiplexer 40 and processed into a specially formatted serial data stream. Preferably, the outputs from 16 CD players 10-1 through 10-16 are input into the multiplexer 40 where their signals are combined and output as two channels to a pair of rate synchronizers. The rate synchronized signals are then input into a multiplexer and signal compressor. The multiplexer and signal compressor preferably use the data compression format described in U.S. Pat. No. 4,922,537, incorporated herein by reference. The multiplexer and data compressor are controlled by input signals from master controller 30-1 which also inputs the program data signals corresponding to the digital audio signals. The digital audio signals are compressed, program data signals are multiplexed therewith, and then the mixed signal is input into a frame sync detector and output formatter. The output formatter may also include circuitry to encrypt the mixed and compressed signals using, for example, the Data Encryption Standard (DES) or using other similar encryption techniques known in the art. The signal may include error correction encoding using, for example, Hamming encoding or Bose Chaudhuri Hocquenghen (BCH) encoding, or other known error correcting/encoding methods.

The audio data is clocked at a rate of 44.1 kilosamples per second. The multiplexed, compressed and encrypted signals are output at 1.13 Mb/sec for every channel. The 30 channels are multiplexed into a composite data stream of 33.9 Mb/sec. and then modulated in an offset quadrature phase shift keying (OQPSK) format before transmission. The serial digital audio/program data stream from multiplexer 40 is input into a digital satellite transmitter 50 which accomplishes the OQPSK modulation and broadcast via antenna 51 and satellite to antenna 59 and digital satellite receivers 60. The location of the satellite receivers 60 may be one of a multiplicity of receiving stations for the digital audio stream. The satellite receivers preferably are located at the headend of a cable system, or other distribution network, which may additionally receive CATV signals via satellite. While satellite transmission is shown, those skilled in the art will realize that any delivery system, not just satellite transmission, may be used, such as cable television (CATV), microwave distribution (MDS or MMDS), telephone systems, terrestrial broadcasts, and other coaxial or optical cable lines.

The digital satellite receivers 60 transfer the digital data to a headend processor 70 which in turns converts and sends the information to audio cable modulators 75. The headend processor 70 permits other digital audio channels from local program origination source 73 to be intermixed with the original nationally broadcasted 30 digital audio channels. The headend processor 70 further acts as a distributor of digital signals which allows different channel arrangements for substitution or addition of the local channels in any order to the digital audio data stream. The processor 70 also demultiplexes the digital audio data stream into more efficiently sized data streams for the audio cable modulators 75. The CATV signals from satellite receivers 60 are passed to CATV cable modulators 78 and modulated in a typical fashion. The modulated digital audio data is then added with modulated signals from the other CATV cable modulators 78 in a combiner circuit 80 and sent over a cable distribution system.

The cable distribution system includes line amplifiers 85 for boosting the signal and for compensating for any line loss. System tap 90 directs the combined signal to the premises of a subscriber which has a digital music tuner 100. Digital music tuner 100 selects a channel containing the digital audio and program data signals. Additionally, digital music tuner 100 separates the digital audio signal from the program information signal. After separation, the digital audio signal is converted to an analog signal, amplified and output to audio equipment of the subscriber, while the program information signal is processed and sent to a local display of remote control 200. The CATV signals are input through splitter 93 from the tap 90 to a CATV set top converter 300 to be viewed on a subscriber monitor 310. The converter 300 may be controlled by the same or a different remote control 200.

Figure 2:
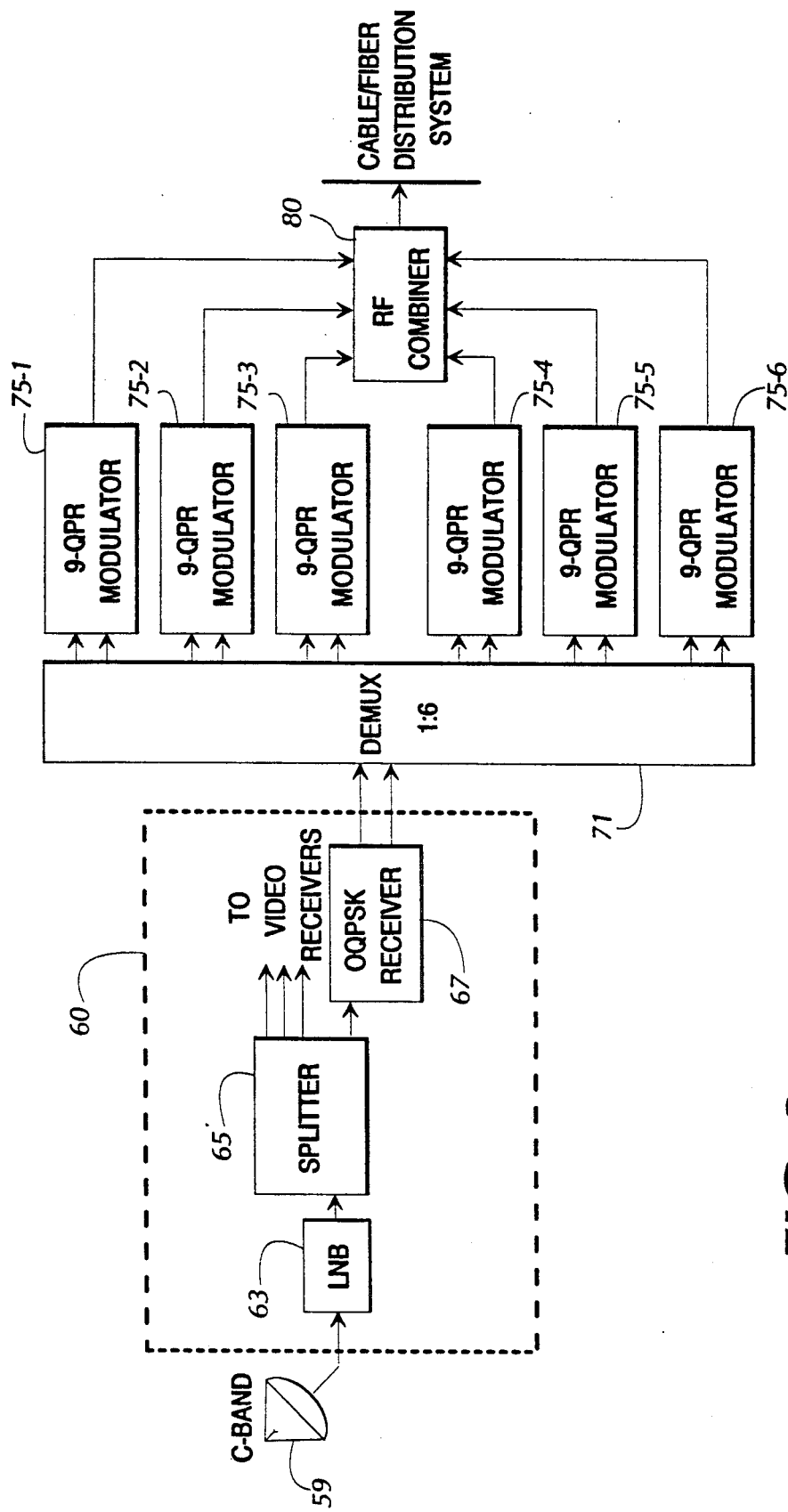
FIG. 2 is a detailed functional diagram of the receiver and audio cable modulator of the system illustrated in FIG. 1.
Figure 5:
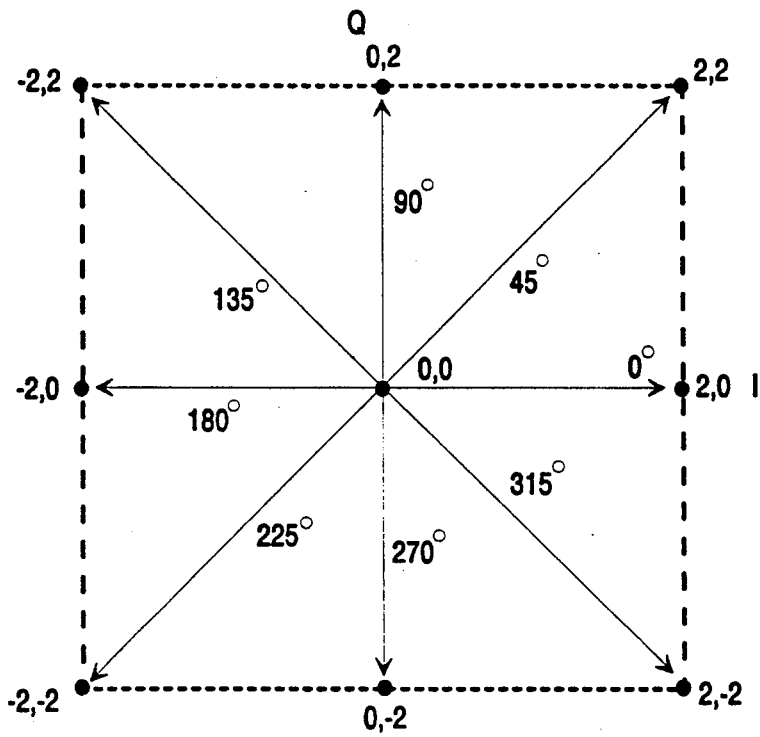
FIG. 5 is a phaser diagram of a 9-QPR modulation on a carrier.

Referring to FIG. 2, a more detailed functional representation of the digital audio portion of the satellite receivers 60 is shown. The mixed, compressed and encrypted digital audio signal is received in the C-band or Ku-band via the satellite receive antenna 59 and amplified and block converted in a low-noise block converter 63 (or merely amplified in a low noise amplifier-LNA), possibly along with other satellite distributed CATV signals. The signal is output in the L-band at 950 to 1450 MHz and input into splitter where the audio signal is routed to OQPSK receiver 67. The other CATV signals separated from the output of LNB 63 by the splitter 65 are demodulated by video receivers (not shown) according to their satellite transmission modulation and thereafter applied to the CATV cable modulators 78.

The receiver 67 demodulates the OQPSK digital audio information and provides one 33.9 Mb/sec. digital data stream containing the 30 satellite distributed audio channels. The 33.9 Mb/sec. signal is output from receiver 67 along with a 33.9 MHz clock into a demultiplexer 71 of the headend processor 70. Preferably, the demultiplexer 71 is a 1:6 demultiplexer which separates the single data stream into six groups of five channels, each containing 5.65 Mb/sec. of digital audio and program data. Each group of five channels is applied to one of six modulators 75-1 through 75-6 with a clock signal. The data signals are clocked at 5.65 MHz to modulators 75-1 through 75-6. Each modulator 75-1 through 75-6 is a nine state quadrature partial response (9-QPR) modulator capable of handling five channels and generating a multiplexed output occupying a 3 MHz bandwidth. The six QPR signals are combined in the radio frequency (RF) combiner 80, transmitted over the cable system to the digital music tuner 100 where they are demodulated and then demultiplexed into single audio channels.

The demultiplexer 71 and modulators 75-1 through 75-6 of the CATV headend and demodulators and demultiplexers of the tuners 100 form a quadrature partial response (QPR) communication system constructed in accordance with the invention. In the preferred implementation of the QPR communication system, a plurality of digital data channels, D1, D2, D3 ... DN which are time division multiplexed into a serial data stream. The serial data stream is applied to a QPR modulator which takes pairs of bits for I and Q phases and modulates them into a quadrature partial response signal which is transmitted over a transmission link (cable system) to a QPR demodulator. The QPR demodulator demodulates the QPR modulated signal into parallel pairs of I and Q bits which can then be combined into a serial data stream and demultiplexed with a demultiplexer into the corresponding data channels D1, D2, D3 ... DN.

The transmission link can be any medium which will support QPR modulation. Preferably, the transmission link is the cable television system which comprises a headend having the QPR modulator and adapted to distribute the QPR modulated signal over the distribution system of the cable television system to a plurality of QPR demodulators located at subscriber premises. In this manner, the QPR modulator will modulate the QPR signal on a carrier located in the cable television frequency band which, for normal operation, is between 54 MHz and 550 MHz. The QPR modulation on such a carrier will occupy approximately 3 MHz of bandwidth and two such modulations will be able to be communicated in a standard 6 MHz television channel. This produces a relatively efficient communication system where digital information can be transmitted at up to 5.65 Mb/sec., thereby providing a bandwidth utilization of approximately 2 b/Hz.

FIG. 4 illustrates in the first pictorial representation four bits of a single group data stream having five channels. Bits A–D are shown for the five channels where the bits are sequentially multiplexed on a time division basis. Further this bit stream is divided into two data streams I, Q by each modulator 75-1 through 75-6 for subsequent modulation. Alternate bits of the data stream are separated into I and Q streams for QPR modulation. By demultiplexing the 30 digital channels into six groups of five channels and those groups into I and Q data streams, the invention effectively accomplishes a number of preferred advantages.

Initially, the demultiplexing of the 30 channels into six groups of five channels allows the selection of an odd number of data channels for transmission by QPR modulation. By using an odd number of channels and separating the alternating bits into I and Q phases it is seen that each channel bit in the separate phases has the maximum separation. In other words, an error in bit IA in the I data stream would have to propagate across five additional bits before that same channel (A) would see an error. This drastically decreases the probability of an error propagating in a single channel from that of a system using QPR modulation and an even number of channels. This is because the correlative nature of the demodulation process for QPR which tends to propagate errors. For example if an error is found in one bit then the probability that the error will propagate to the next bit is $\frac{1}{2}$. The probability of error propagation decreases with every bit spacing by a function related to $\frac{1}{2}^N$ where N is the number of bits between a individual channel bits.

When using QPR modulation the data is demultiplexed into two data streams, I and Q, to double the data rate while maintaining the same bandwidth. Because these are separate channels and demodulated without cross correlation, errors do not propagate across the phases. But, if the channel groupings used an even number, the spacing between individual channel bits would also be cut in half (one half of the channels would be transmitted by the I phase and one half by the Q phase). Advantageously, as is shown in FIG. 4, the use of an odd number of channels per group allows the maximum spacing (all channels are transmitted on one data stream phase but half the bits of each channel) before another bit of that channel occurs. This maintains maximum separation and minimizes propagation of any errors while taking full advantage of the robust and efficient QPR modulation technique. It is evident that this technique can be used not only for the modulation technique shown (9-QPR) but also for other techniques which use correlation in their demodulation process.

Additionally, an even number of channels (6) per grouping can be used, as is shown in FIG. 4, by inserting an offset bit in the two data streams. The offset bit is used in a data channel so that the bit sequence does not repeat in that channel until all other bits have been used. The offset bit lowers the information data rate significantly but does decrease the probability of error propagation in the separately phased channels. However, it is evident that the data bit need not be wasted. Encryption control messaging, or other types of useful data can be filled into these slots.

Figure 6:
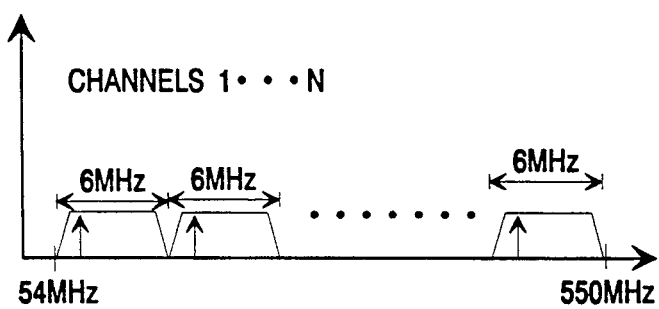
FIG. 6 is a pictorial representation of a standard CATV spectrum divided into a plurality of channels, each 6 MHz in bandwidth.

FIG. 6 illustrates the partial response (duobinary) signal for a digital data stream shown in the drawing. It is a tertiary state signal which can be amplitude modulated onto a carrier. When two of these amplitude modulated signals are provided as they form a nine state QPR modulation as shown in the state diagram in FIG. 7. The I modulation is at 0° and has levels 2, 0, and −2, whereas the Q modulation has levels of 2, 0, and −2 at 90° phase. The other states of the QPR signal are combinations of the differing states of two signals each having three states.

The modulated signals from modulators 75-1 through 75-6 are combined in radio frequency combiner 80 along with other modulated signals from other cable modulators 78 (FIG. 1). Modulators 75-1 through 75-6 digitally filter the data, quadrature partial response (QPR) modulate and translate the QPR signals to a selected output frequency with suppressed carrier for combining with other modulated channels 77 in the present cable television system. Each group of five channels occupies 3 MHz of bandwidth and can be carried in half of one 6 MHz video channel, or other vacant 3 MHz frequency slot, of the present cable television system. Since the present system may use a common 6 MHz video channel, no modifications of current CATV distribution system equipment is required. Additionally, because of the robust digital modulation technique, greater S/N ratios are tolerable on the audio channels. They may be transmitted at lower power levels thereby reducing overall power loading on the cable system and avoiding distortion of the other CATV signals.

Figure 7:
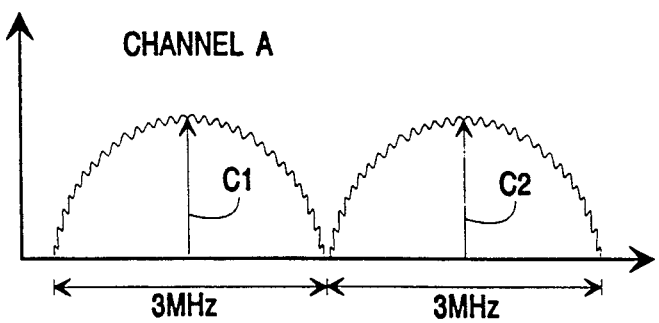
FIG. 7 is a pictorial representation of a single 6 MHz band (Channel A) of the system illustrated in FIG. 6 with two 3 MHz digital audio channels contained therein.

FIG. 6 illustrates a typical CATV spectrum where the normal cable bandwidth from 54 MHz to 550 MHz is divided into a multiplicity of 6 MHz channels. Each channel has a carrier frequency $f_1, f_2, \ldots f_n$ on which is amplitude modulated by a National Television Standards Committee (NTSC) television signal. The cable operator, if the digital audio channels are to be used, can reserve for the 30 audio channels 3 TV channels of 6 MHz apiece, 10 other 3 MHz frequency slots, or any combinations thereof. FIG. 7 illustrates the spacing of the digital audio channels within a single 6 MHz bandwidth. The five multiplexed digital audio channels are QPR modulated on a suppressed carrier C1. The carrier frequency is located $\frac{1}{4}$ of the way between the beginning of the 6 MHz bandwidth and its end. The QPR modulation for the bit rate chosen substantially covers the 3 MHz between the beginning of the channel and the middle of the channel. Another QPR modulated suppressed carrier C2 may then be located at the $\frac{3}{4}$ distance in the channel where its bandwidth will cover the second 3 MHz of the channel.

Figure 8:
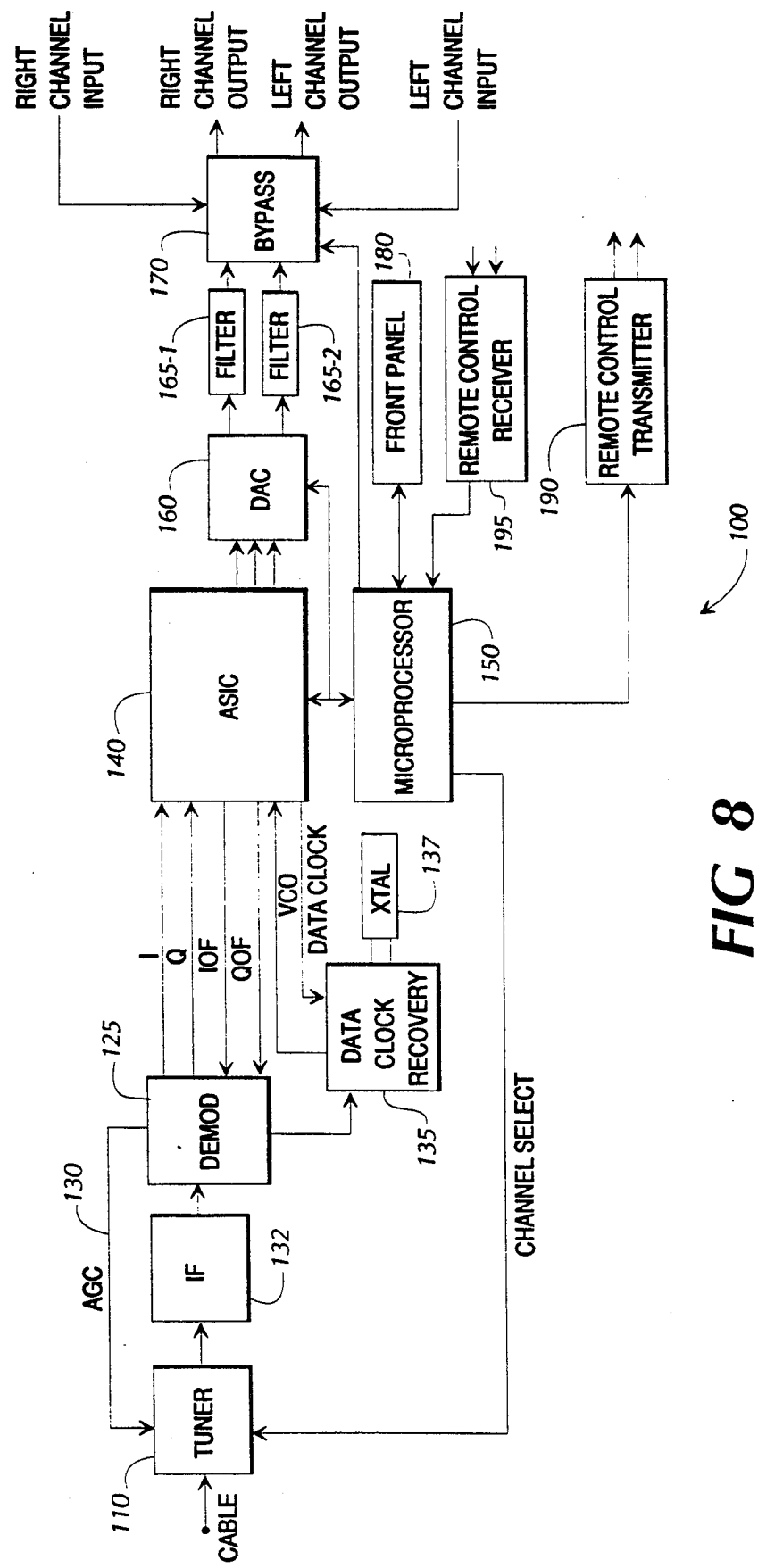
FIG. 8 is a detailed block diagram of the tuner illustrated in FIG. 1.

Referring to FIG. 8, a block diagram of the digital music tuner 100 is shown. The digital audio and program data signal is input from directional coupler 93 (FIG. 1) into a channel tuner 110. The channel tuner 110 preferably includes phase locked loop circuitry in its local oscillator. The signal from channel tuner 110 is converted to an IF frequency and processed by IF circuit 132 before being demodulated by demodulator 125. The output of demodulator 125 is QPR demodulated to produce a 5.65 Mbps data stream containing five stereo pairs of digital audio data to an application specific integrated circuit (ASIC) 140. Demodulator 125 also provides an automatic gain control signal 130 to tuner 110 to maintain a constant signal level. Additionally, demodulator 125 provides a clock tone to clock recovery circuit 135. Data clock recovery circuit 135 contains a 33.9 MHz crystal 137 from timing purposes.

This timing signal is sent to ASIC 140, which will be discussed in greater detail with reference to FIG. 11. The digital audio signals are output from ASIC 140 to a digital to analog converter 160. From digital to analog converter 160, the analog left and right audio signals are filtered through filters 165-1 and 165-2 and input into bypass 170. Bypass 170 allows additional audio components (e.g., a CD player or tape deck) to be switchably connected with the digital music tuner 100.

A microprocessor 150 controls the phase locked loop of tuner 110, ASIC 140, digital to analog converter 160 and bypass 170. The program data signal from ASIC 140 is sent to microprocessor 150 where it is stored in internal memory of the microprocessor, and may be displayed on front panel interface 180 or transmitted through remote control transmitter 190. Remote control receiver 195 may select particular program data information or audio channels through microprocessor 150 via remote control 200. Additionally, tuner 100 preferably has input means, e.g., push buttons or toggle switches, on the exterior of its housing. These input means would allow selection of channels, stations, display of program data, and display of particular information blocks contained in the program data signal.

Figure 9:
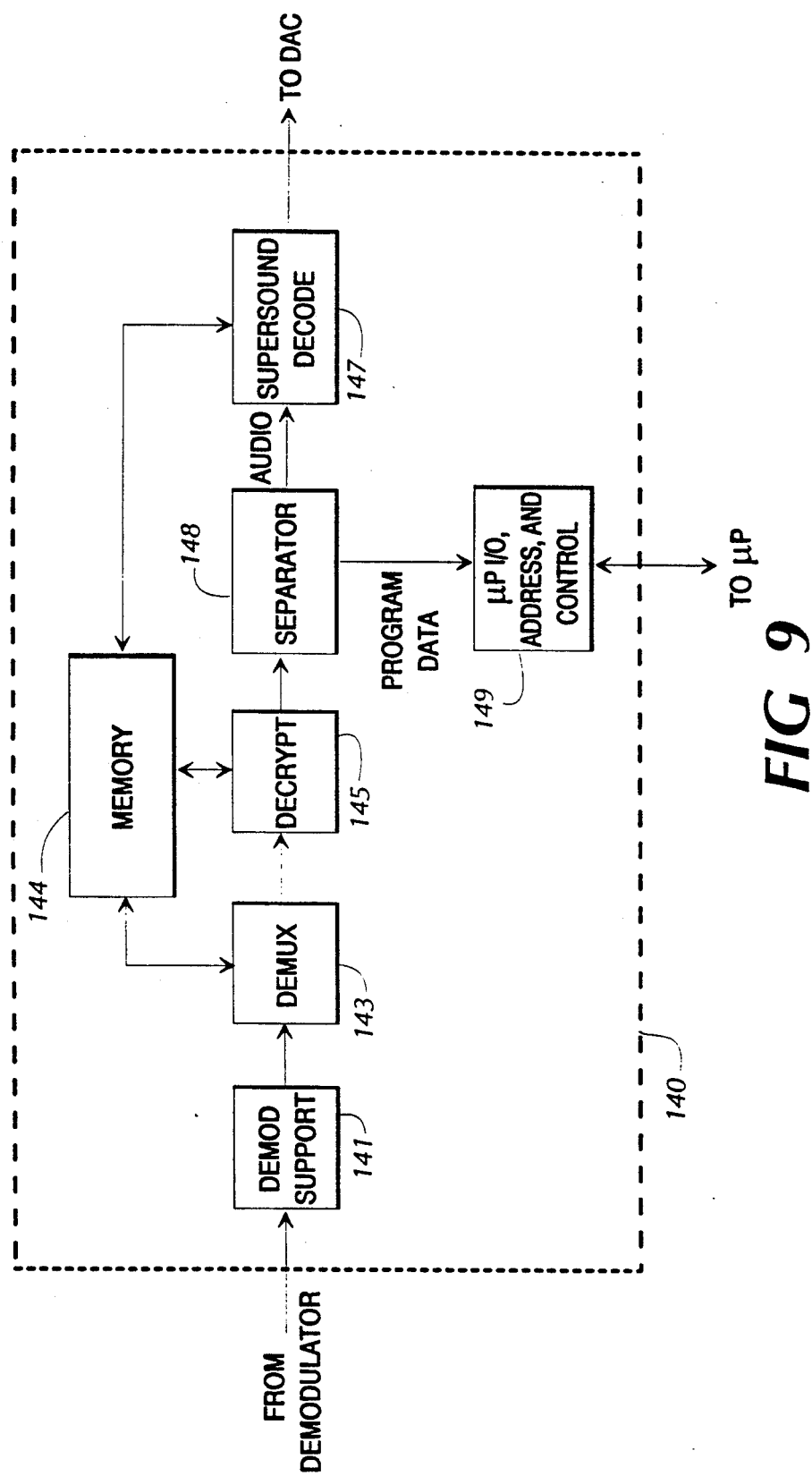
FIG. 9 is a detailed functional block diagram of the application specific integrated circuit illustrated in FIG. 8.

Referring to FIG. 9, a more detailed block diagram of ASIC 140 is provided. The signal from demodulator 125 is input into demodulator support circuit 141 which comprises logic circuitry (e.g., flip-flops) required for sampling the demodulated signal. The signal from demodulator support circuit 141 is then input into demultiplexer 143 which separates the 5.65 Mb/sec. data stream to select one of five stereo pairs of digital audio signals. This signal is then sent to decrypting circuit 145. The decrypted signal is then separated in signal separator 148 where program data is sent to microprocessor I/O circuit 149 while audio data is sent and decoded in circuit 147. Decoder 147 may use the data decompression technique described in U.S. Pat. No. 4,922,537, incorporated herein by reference. Microprocessor I/O address and control circuit 149 interfaces with microprocessor 150. Memory 144 stores bits of data to support the demultiplexing, decrypting and decoding functions occurring in circuits 143, 145 and 147 respectively. The memory may be of a nonvolatile type such as an Electronically Programmable Read Only Memory (EPROM) or similar memory, or may be a volatile type Random Access Memory (RAM) memory supported by a battery.

The QPR demodulator and its support circuity will now be more fully described with reference to FIG. 10. The QPR modulated signal containing five digital channels multiplexed together is input to the channel tuner 110 of the digital music terminal 100. The microprocessor 150 of the terminal 100 controls the frequency of a local oscillator in the tuner with a channel selection signal to mix with the suppressed carrier of the selected 3 MHz channel. The local oscillator frequency is selected so that the channel frequency is converted to an intermediate frequency of 44 MHz. The IF signal is amplified in an IF amplifier 302 and bandpass filtered by a surface acoustic wave (SAW) filter 304 before being input to a second IF amplifier 306 which produces a balanced output.

From the IF amplifier stages 302, 306, the IF signal is divided into two paths. The initial path through the data clock recovery circuit 135 provides for recovery of the clock of the digital data stream and automatic gain control. The second path through first and second demodulator stages provides the demodulation of the QPR signal into two digital data streams. The recovered clock signal is used to latch the demodulated data into latches 336, 350 formed of D-type bistables. The channel tuner 110 and demodulator circuitry thereby regenerate the two digital data streams I and Q having the five digital channels multiplexed therein.

The data clock recovery circuit 135 uses an envelope detector 308 to produce a clock tone frequency from the incoming QPR signal. The data clock tone is amplified by amplifier 310 and bandpass filtered by filter 312. The output is then limited in a hard limiter 314 to produce edge transitions at the zero crossings of the tone waveform. The edge transitions are compared to a digital clock edge in multiplier 316 and the error minimized by integrator 318. The integrator produces a control voltage which shifts the frequency of a crystal controlled oscillator 320. The output of oscillator 320 is divided first by 6 in divider 322 to provide a system clock to the ASIC 140 and then by 2 in divider 324 to provide the data clock. The multiplier 316, integrator 318, VCO 320, and dividers 322, 324 form a phase locked loop which follows the phase of the recovered data clock tone output from limiter 314. The clock signal provided by divider 324 is at the data rate of 44.1 Kb/sec. and is used to clock the I and Q data from limiters 334, 348 into latches 336, 350. The location of the data clock edge with respect to the demodulated data is changed by varying the tuning of the filter 312. This produces controllable amounts of phase lag or lead in the data clock tone thereby changing the relative timing relationship between the data and the clock. Normally, the clock is set to sample a bit value about in the middle of the demodulation process so that the most probably correct value is latched into the latch.

Demodulation is produced for the Q phase of the QPR signal by a demodulator stage having a decision feedback circuit and comprising a four quadrant multiplier 328, a current to voltage amplifier 330, a low pass filter 332, a limiter 334, the bistable 336, and a voltage to current amplifier 338. Similarly, demodulation is produced by a decision feedback circuit comprising a four quadrant multiplier 340, a current to voltage amplifier 342, a low pass filter 346, a limiter 348, the bistable 350, and a voltage to current amplifier 344 for the I phase of the IF QPR signal.

The Q phase decision circuit has as one input to the multiplier 328 the IF QPR signal and as the other input a 44 MHz demodulator carrier whose quadrature phase is dependent on the recovered carrier through a modified Costas loop circuit which will be more fully described hereinafter. The output of the 4-quadrant multiplier 328 is a balanced current which corresponds to the amplitude modulation on the carrier of the Q phase of the IF signal. This amplitude modulation is the partial response encoded value of the present bit and must have subtracted from it the value of the previous bit to be decoded from partial response format. The previous bit value is latched in the bistable 336 for use in the decoding and demodulation process. The previous bit value is fed back through the amplifier 338 in the form of a balanced current which can be subtracted in the node connecting the multiplier 328 and amplifier 330. The decoded amplitude modulation is then converted to a voltage in amplifier 330 and low pass filtered in filter 332. The balanced output of the filter (Q and *Q) is input to the limiter 334 which converts the balanced analog signals into a digital logic level which can be latched into the bistable.

The I phase of the IF QPR signal is demodulated in the corresponding circuitry for the demodulator in an identical manner. The IF signal is input to the multiplier 340 where it is mixed with the inphase phase of the 44 MHz oscillator. The balanced output of the multiplier 340 has subtracted from it a balanced current produced by amplifier 344 which is representative of the previous bit value stored in bistable 350. The currents from the nodes connecting the multiplier 340 and amplifier 344 are converted to voltages in the amplifier 342. Thereafter, the output of the amplifier 342 is filtered by the lowpass filter 346 and compared in the limiter 348 to produce a digital logic level signal which can be latched into the bistable 350.

To lock the 44 MHz oscillator to the suppressed carrier, the invention uses a modified Costas loop to extract a coherent carrier signal. The balanced outputs of the filter 332 for the Q phase (Q, *Q,) are connected to the input terminals of a single pole, double throw, analog switch 352 while the balanced outputs of the filter 342 for the I phase (I, *I) are connected to the input terminals of another single pole, double throw analog switch 354. The pole terminals of switches 352, 354 are connected to the differential inputs of an integrating amplifier 356. The control terminals of the switches 352, 354 are cross connected to the outputs of the limiters 334, 348, respectively, such that the digital values on the output of the limiters control the action of the switches.

The configuration produces switching such that, for a high logic level on the output of the Q phase limiter 334 the *I signal is output from switch 354 and, for a low logic level, the I signal is output from the switch 354. Conversely, for a high logic level output of the I phase limiter 348, the Q signal is output from switch 352 and, for a low level signal, the *Q signal is output from switch 352. The selected combination of the I and Q signals is differenced by the inputs of integrating amplifier 356 to produce an error voltage which is minimized. The output of the integrator 356 controls the frequency of the 44 MHz oscillator circuit such that a coherent carrier is applied to the multipliers 328, 340 for the demodulation of the data signals.

The demodulation of the QPR signal by the inphase and quadrature phase mixing of the multipliers 328, 340 may be explained by reference to equation (1) below:

$$V(t) = M_i(t)\sin(\omega_c t) + M_q(t)\cos(\omega_c t) \quad (1)$$

where V(t) represents the time varying function of the QPR signal, $\sin(\omega_c t)$ and $\cos(\omega_c t)$ are the inphase and quadrature phases of the carrier frequency, respectively, and $M_i(t)$ and $M_q(t)$ are the partial response amplitude modulations on those respective carriers.

If V(t) is multiplied by a coherent carrier (no phase angle between the carriers) $\sin(\omega_c t)$ equation (1) becomes:

$$V(t)\sin(\omega_c t) = M_i(t)\sin^2(\omega_c t) + M_q(t)[\sin(\omega_c t)\cos(\omega_c t)] \quad (2)$$

by the identity $\sin^2(\omega t) = \frac{1}{2}[1 - \cos(2\omega_c t)]$ the first right hand term of the equation becomes:

$$V(t)\sin(\omega_c t) = M_i(t)*\tfrac{1}{2}[1 - \cos(2\omega_c t)] + M_q(t)*\tfrac{1}{2}\sin(2\omega_c t) \quad (3)$$

where $\tfrac{1}{2}M_i(t)$ is representative of the demodulated amplitude level of the partial response bit for the I phase and the frequency $2\omega$ is removed by the low pass filter.

Similarly, if equation (1) is multiplied by the quadrature phase of the carrier, $\cos(\omega_c t)$, it becomes:

$$V(t)\cos(\omega_c t) = M_i(t)[\sin(\omega_c t)\cos(\omega_c t)] + M_q(t)\cos^2(\omega_c t) \quad (4)$$

using the trigonometric identity $\cos^2(\omega t) = \tfrac{1}{2}[1 + \cos(2\omega_c t)]$, the second right hand term of the equation (4) becomes $$V(t)\cos(\omega_c t) = M_i(t)*\tfrac{1}{2}\sin(b\omega_c t) + M_q(t)\tfrac{1}{2}[1 + \cos(2\omega_c t)] \quad (5)$$

where $\tfrac{1}{2} M_q(t)$ is representative of the demodulated amplitude level of the partial response bit for the Q phase and the frequency $2\omega$ is removed by the low pass filter.

Because the levels of the I and Q phase, $\tfrac{1}{2} M_i(t)$ and $\tfrac{1}{2} M_q(t)$, respectively are still encoded as partial response signals, they are decoded by subtracting the previous bit value from the levels. This is accomplished by the decision feedback through the voltage to current converters 338, 344 which convert the digital bit level from the latches 336, 350 into a current levels representative of the value of the previous bit. This current level may then be subtracted from (added out of phase to) the levels $\tfrac{1}{2} M_i(t)$ and $\tfrac{1}{2}M_q(t)$ to yield analog levels representative of the current bit values. The current bit values pass through the filters 332, 346 and are extracted from equations (3) and (5) by the limiters 334, 348. The current bit values replace the previous bit values in the latches 336, 350 at the data clock frequency and the cycle repeats for subsequent bits in the data streams.

Figure 10:
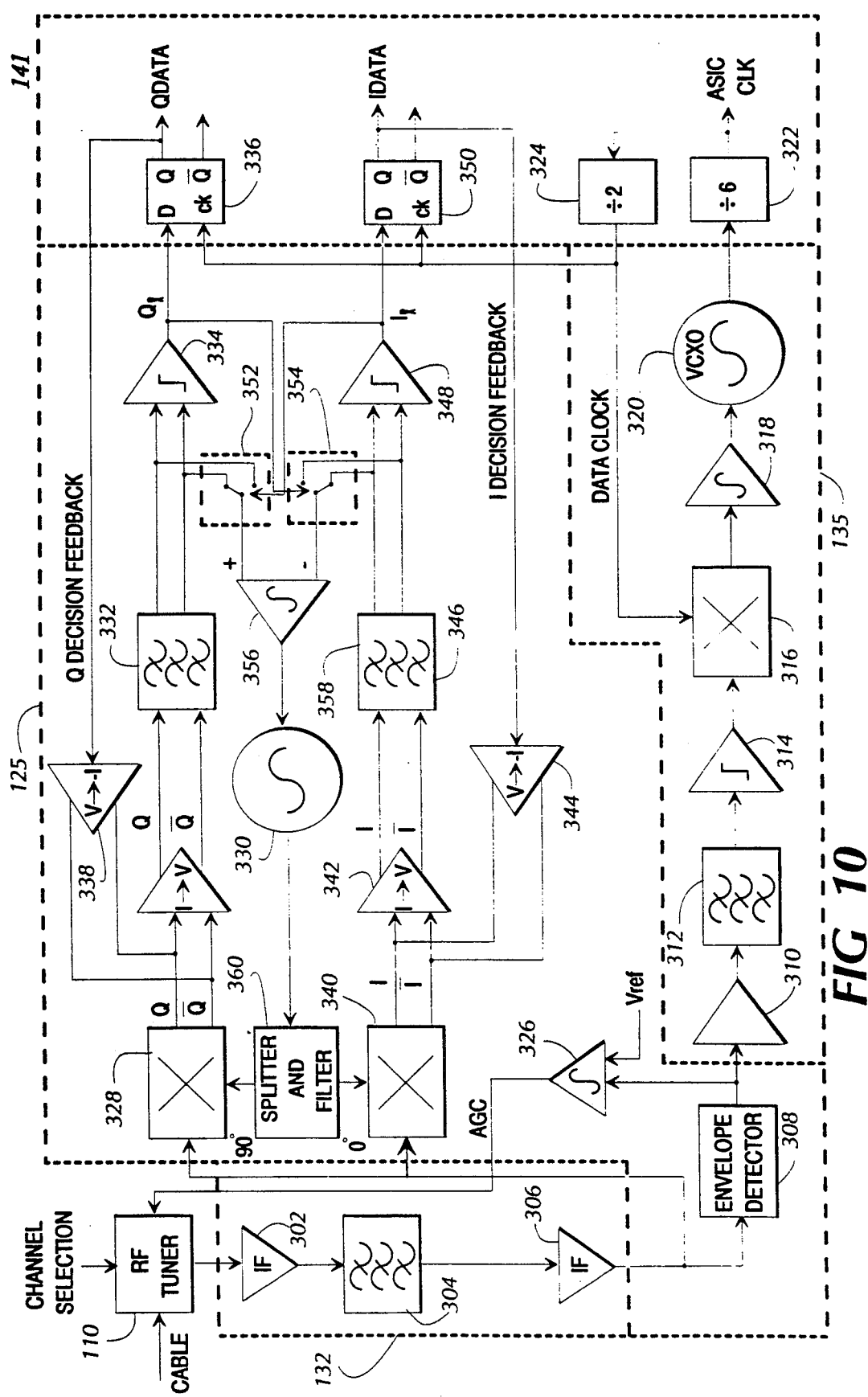
FIG. 10 is a detailed functional schematic diagram of the demodulator illustrated in FIG. 8.
Figure 11A:
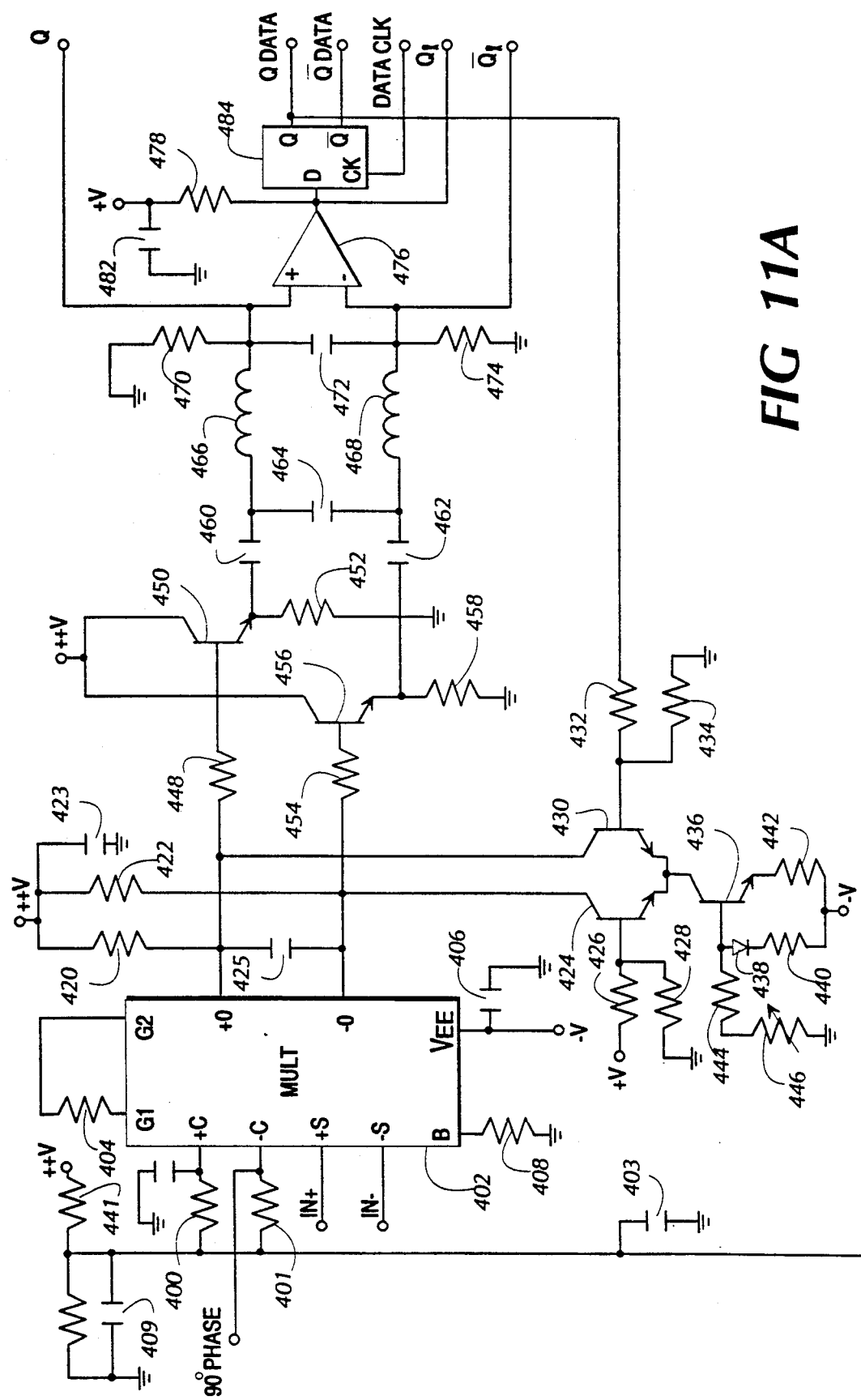
FIGS. 11a and 11b are detailed electrical schematic of the I and Q demodulators illustrated in FIG. 10.
Figure 11B:
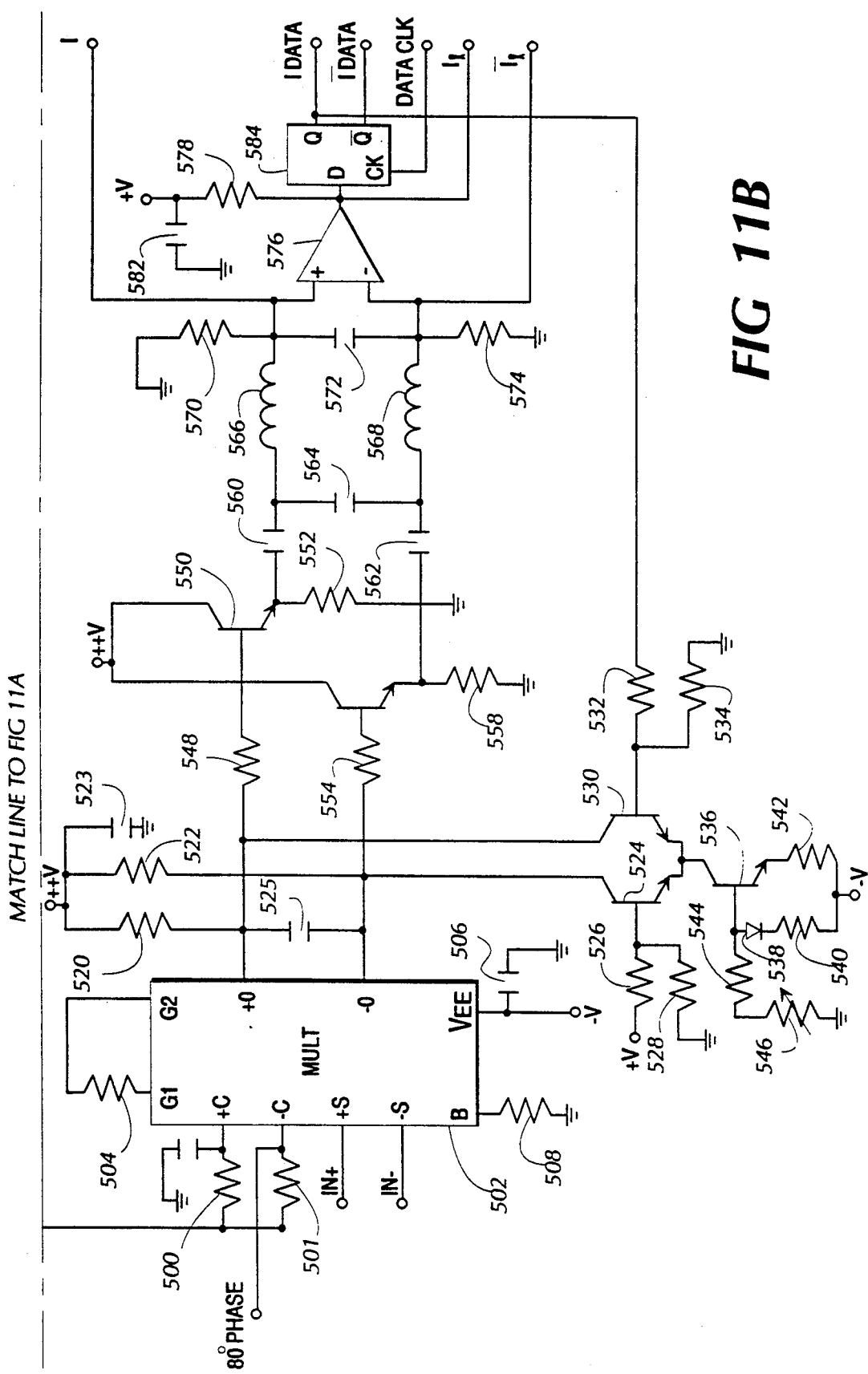

FIG. 11 is a detailed circuit diagram of the demodulator circuitry illustrated in FIG. 10. The demodulation circuitry includes two substantially identical circuits for the I and Q phases of the QPR signal which include elements performing similar functions which are referenced by reference numerals differing by 100. The Q phase circuitry includes a four quadrant integrated circuit multiplier 402 which has a balanced input IN+, IN− from the intermediate frequency amplifier 306. The other balanced input to the multiplier 402 is from a DC bias comprising a network of resistors 407, 411, 400, and 401. Decoupling capacitors 404 and 409 allow high frequency noise components a path to ground. On this DC bias is modulated the 90° (quadrature phase) output of the Costas loop carrier recovery circuit. The multiplier circuit 402 further has a gain control resistor 404 connected between the gain inputs G1, G2. A bias resistor 408 connected between the bias input B and ground provides a bias for the active circuit components of the IC chip. The four quadrant multiplier produces a balanced current output from terminals (+O) and (−O) to the bases of a pair of NPN transistors 450 and 456 through resistors 448, 454. The transistors 450 and 456 in combination with resistors 420 and 422 comprise the current to voltage amplifiers and are configured as emitter followers. The emitter of transistor 450 is connected to a resistor 452 which is thereafter connected to ground. Similarly, the transistor 456 has an emitter resistor 458 which is connected between its emitter and ground. The emitter followers provide a high input impedance to the current combination nodes and output a voltage proportional to the voltage developed on the bases of transistors 450, 456.

The balanced outputs from the emitter followers are input to the low pass filter through a pair of coupling capacitors 460 and 462. The filter is a balanced input, balanced output Bessel function type filter comprising capacitors 464, 472, inductors 466, 468, and resistors 470, 474. The filter passes the low frequency modulation $M_i(t)$ and $M_q(t)$ while filtering out noise components such as the frequency $2\omega$ and higher harmonics. The outputs of the balanced filter are the signals Q and *Q which become one set of inputs to the carrier recovery circuit. Additionally, these analog signals are input to a comparator 476 through its inverting and non-inverting inputs, respectively. The comparator 476 operates as a limiter having a pull up resistor 478 connected between its output and the positive voltage +V. Capacitor 482 is used as a RF ground for decoupling noise. The comparator 476 takes the differential amplitude between the balanced outputs of the filter and produces either a +OV or +V output, depending on the sign of the difference. This decodes the bit into a digital logical level signal where the bit state 0 corresponds to a low logic level +OV and a 1 state corresponds to a logic high level +V. This digital signal is transistor-transistor logic (TTL) compatible with generalized logic, such as the D type bistable 484 to which it is input at the D terminal. The data bit from limiter 476 is clocked into the latch at a clock rate commensurate with the bit rate of the QPR signal. Either the present data (Q data) or its inverse (*Q data) is used by the other parts of the circuit for demultiplexing as previously discussed.

The Q data output of the bistable 484 is further fed back to the voltage to current amplifier which produces the decision feedback decoding by subtracting a previous bit value from the present bit value. The voltage to current amplifier comprises the mirror NPN transistors 424 and 430 which are coupled at their emitters to the collector of a NPN transistor 436 configured as a current sink. The base of the transistor 436 includes a bias to ground through resistors 440, 444, diode 438, and variable resistor 446. The collector to emitter current is controlled by connecting the emitter through a resistor 442 to a minus voltage supply −V. The constant bias on the transistor 436 provides a controlled current sink which the mirror transistors 424 and 430 feed through their emitters. The collectors of the transistors 424 and 430 are connected to the positive supply ++V through resistors 422 and 420, respectively. Capacitor 423 decouples noise to the supply from the circuit. The junction of the resistor 420 and collector of transistor 430 form a current combination node at the output (+0) of the multiplier 402. Similarly, the junction of the resistor 422 and the collector of transistor 424 form a current combination node at the output (−O) of the multiplier 402. The base bias for transistor 424 is a constant voltage from the junction of a divider comprising resistors 426 and 428 connected between the positive voltage +V and ground. The bias to transistor 430 is from the junction of resistor 432 and 434 which is connected between the Q data output of the bistable 484 and ground.

Operationally, for a low level voltage from the output of the bistable 484 which represents a digital 0 for the previous bit, transistor 430 is off and transistor 424 is on. The amount of current that is drawn through the sink transistor 436 is therefore constant at a level determined by resistor 422 and 442. This level corresponds to the $M_i(t)$ of a particular state. If, however, the output level voltage from the Q output of the bistable 484 is a high TTL level, then transistor 430 is additionally in an on state and the constant current drawn through the sink transistor 436 is determined by the parallel combination of resistors 420, 422 in series with resistor 442. This constant current corresponds to the opposite state level of the $M_i(t)$ DC level. The voltage to current converter converts the logic level (Q data) into balanced current levels corresponding to the demodulated amplitude levels of the incoming signals. In this manner, the previous bit level is subtracted form the present bit level to decode the partial response signal that is originally present at the output of the multiplier 402.

The decision feedback current operates by combining a predetermined amount of positive current or negative current with the current outputs of the multiplier depending upon whether the decision bit value is a 1 or a 0. In FIGS. 12 and 13 this operation is illustrated for the positive (+O) outputs of multipliers 402, 502 of the I and Q channels, respectively. The negative outputs (−O) of multipliers 402, 502 would have the inverse of the waveforms shown. Waveform A shows the tertiary level current signal $M_i(t)$ from the output +O of the multiplier 402 having three levels {1, 0, −1}. A binary decision feedback waveform B having two levels (+0.5, −0.5) is combined with waveform A to produce waveform C which results. Waveform C is essentially a two level signal at the sampling time. The limiter 476 is used to convert the analog signal and its inverse to a digital logic level signal and thereby remove amplitude variations from the final signal due to noise, imperfect demodulation, or other errors.

The I phase circuitry operates in a similar manner to the Q phase circuitry by having a multiplier 502 which has a balanced input IN+, IN− from the intermediate frequency amplifier 306 and another input from the carrier recovery circuit. The I phase carrier recovery signal at 0° phase. The current to voltage amplifier for the I phase is implemented by the NPN transistors 550 and 556 which are configured as emitter followers. The balanced filter comprises capacitors 564, 572, resistors 570, 574 and inductors 566 and 568. The limiter for the I phase signal path is implemented by the operational amplifier 576 with pull up resistor 578. The limiter 576 is connected as previously discussed to the D terminal of a D-type bistable 584 which is clocked by the recovered data clock. Its output is similar in that either the data I data or its inverse *I data is supplied to the rest of the ASIC processing circuitry. A similar voltage to current subtraction circuit is supplied by the current sink transistor 536 and the mirror switching transistors 524 and 530.

FIG. 12 will now be more fully explained to illustrate the operation of the carrier recovery circuit which drives the I and Q phases of the demodulator. To perform the demodulation it was previously discussed that a demodulating carrier phase coherent with the information carrier needs to be generated and that for the quadrature demodulation an in phase and quadrature phase of this carrier is necessary. The preferred implementation in FIG. 10 accomplishes these functions in an efficient and advantageous manner by providing a modified Costas loop carrier recovery circuit which is phase coherent with the QPR signal.

Figure 14:
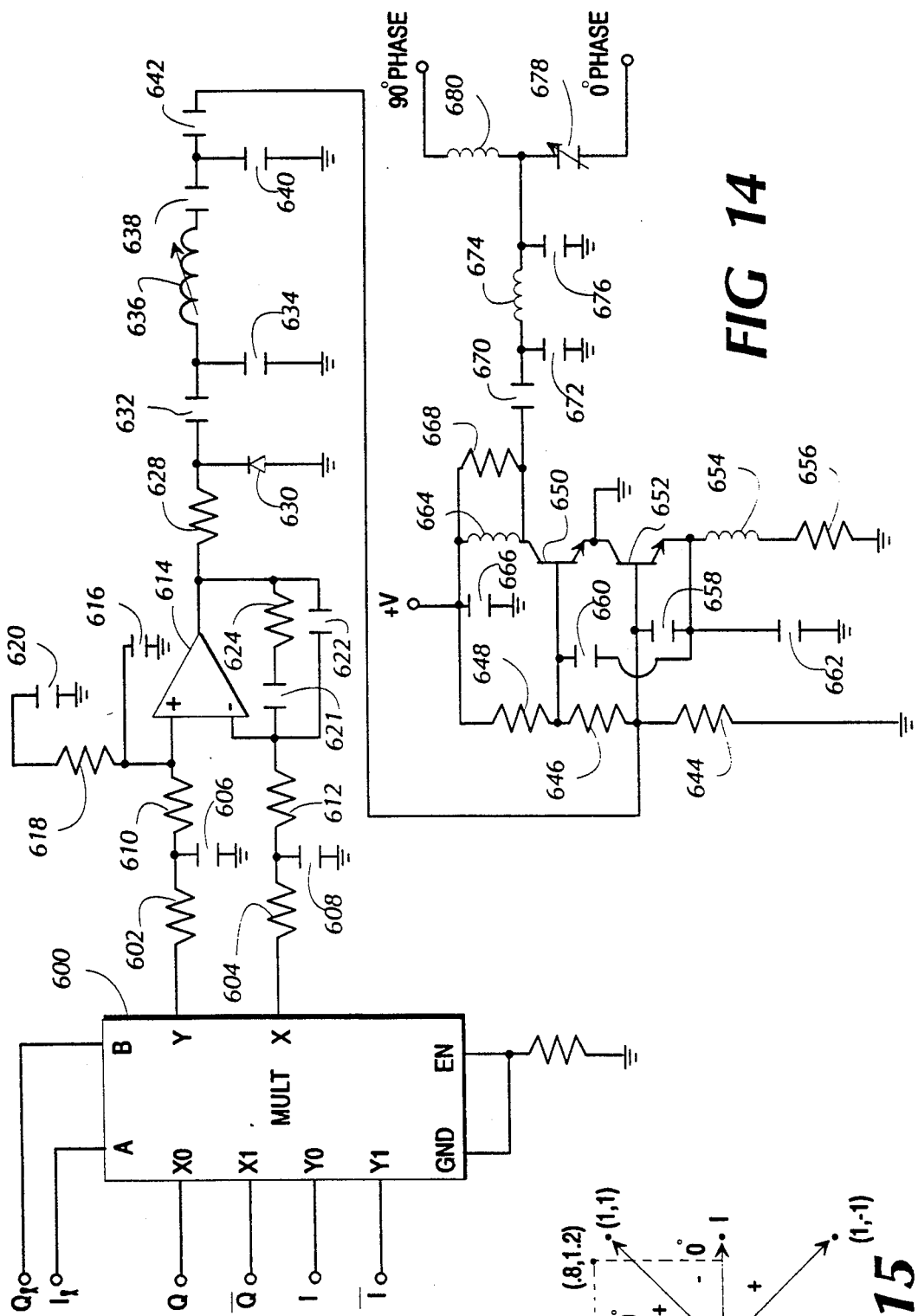
FIG. 14 is a detailed electrical schematic of the modified Costas loop carrier recovery circuit illustrated in FIG. 10.

With reference now to FIG. 14, the carrier recovery circuit includes a pair of solid state analog switches of the two pole, single throw variety which preferably can be an integrated circuit 600. The digital outputs from the limiters 476, 576 are used to control the state of each switch by their input to the A, B control terminals of the switches. The Q, and *Q signals from the balanced filter are input to the X0, X1 terminals of one switch and the I, and *I signals from the balanced filter are input to the Y0, Y1 inputs of the other switch. When the A and B control inputs are low, the X0 input is output from the X output terminal and the Y0 input is output from the Y output terminal. The X output switches to the X1 input upon the application of a high logic level signal to the A terminal and the Y output switches to the Y1 input upon the application of a high logic level signal to the B terminal.

The outputs X, Y of the switches are connected to the inverting and noninverting inputs, respectively, of operational amplifier 614 through prefilters. The X output is filtered by resistor 604 and capacitor 608 while the Y output is filtered by resistor 602 and capacitor 606. The operational amplifier 614 is configured as an integrator and has differential inputs. An input network comprising resistor 610 and resistor 618 whose junction is connected to the noninverting input contributes to the integrator time constant. A feedback circuit comprising a capacitor 622 and resistor 624 connected in parallel with a capacitor 622 is coupled between the output of operational amplifier 614 and its inverting input. Depending upon the states of the bits in the limiters, different combinations of the I and Q signals are differenced to determine if there is any phase error between them. If there is an error, the integrator produces a control voltage output from resistor 628. The control voltage is one polarity if the difference is positive and another polarity if the difference is negative.

The control voltage is input to a varactor 630 which varies its capacitance based upon the applied voltage. The varactor 630 and circuitry comprising capacitors 632, 634, 638–642, and inductor 636 determine the frequency of oscillation of a voltage controlled oscillator comprising NPN transistors 650, 652. Transistor 650 is coupled at its collector through inductor 644 and parallel resistor 668 to the power supply +V and at its collector to ground and at its emitter through inductor 654 and series resistor 656 to ground. A DC bias network for the transistors 650, 652 includes resistors 644, 646, and 648 connected between the power supply +V and ground.

Bias current is supplied to the base of transistor 650 from the junction of resistors 646 and 648 while bias current is supplied to the base of transistor 652 from the junction of resistors 644, 646. A positive feedback path is provided by a capacitor network comprising capacitor 658 and 662. A feedback signal from junction of the emitter and inductor 654 is supplied to the base of transistor 652 through capacitor 658 and to the base of transistor 650 through capacitor 660. The inductors 654 and 664, and capacitors 658, 660, 662 along with the aforementioned control circuitry determine the frequency of the oscillation which is selected as the intermediate carrier frequency 44 MHz. This frequency can be varied slightly by the control voltage applied to the varactor 630 to phase lock to the particular phase of the carrier chosen for demodulation.

The coherent recovered carrier is then output through coupling capacitor 670 to a matching and harmonic suppression filter comprising capacitor 672, inductor 674, and capacitor 676. The recovered carrier signal is then split at the junction of variable capacitor 678 and inductor 680. The inductor causes a 90° lag between the recovered carrier signal output at the capacitor 676 and its output terminal. This provides an in phase and quadrature phase coherent carrier for the demodulation process. The quadrature phase difference may be adjusted by the variable capacitor 678.

The operation of the carrier recovery circuit can be understood from the equation for the Costas error voltage Ve which is used to control the integrator 614. It can be shown that the Costas error voltage Ve is essentially:

$$Ve = [SIGN(I)*Q] - [SIGN(Q)*I] \quad (6)$$

Figure 15:
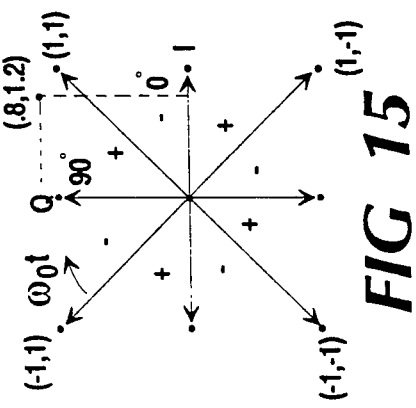
FIG. 15 is a phase diagram of the decoded demodulation.

It should be noted that the equation 6 provides a difference voltage based on which quadrant the decoded data is in and a direction (either positive or negative) to move the local oscillator to the correct phase. Because the digital voltage level output from each limiter of each demodulator loop essentially performs the SIGN function, it is only necessary to select the correct analog voltage level of the decoded bit of the alternate phase for that information. The balanced outputs of the filters permit a simple switching selection for generating the two terms on the right hand side of equation 6. For example, if the output of the limiter 576 for the I phase is 0 volts, i.e., SIGN(I) =(−), then the analog voltage *Q is chosen by the switch 600 to be differenced in the integrator 614. If the output of the limiter 576 for the I phase is +V volts, i.e., SIGN(I) =(+), then the analog voltage Q is chosen by the switch 600 to be differenced in the integrator 614. The same holds true for the opposite phase Q, where for the output of the limiter 476 at 0, +V volts, the analog voltages *I, I, respectively are chosen by the switch 600 to be differenced in the integrator 614. The sign of the difference voltage Ve indicates the direction of the phase shift while the magnitude of the error voltage Ve represents the amount of the phase error necessary to relock the loop, where the error has been minimized nearly to zero. The Costas loop locks the demodulation carrier to the QPR signal carrier by noting that a phase error will produce a demodulation (analog bit level) different from that of a nominal level (±1). The nominal level outputs (states) for the decoded bits are illustrated in FIG. 15. this constellation is rotated at the carrier frequency $\omega_c$ and to produce these nominal levels requires a demodulation carrier with no phase angle (coherent with $\omega_c t$). The error in the amplitude of the bit level for one phase is further related to the error in the bit level for the opposite phase, i.e., if I is less because of the phase error Q will be proportionately more (see equations 3 and 5). By taking the absolute difference between the two levels, an indication of the amount of phase error and the direction to correct it can be calculated. For example, if I equals +0.8 and Q equals 1.2, then the nominal states should be (1,1) in the first quadrant and Sign (I) * Q − Sign (Q) * I = +0.4. This indicates that the demodulation carrier is lagging the APR signal carrier and must be increased until the error voltage +.4 is minimized.

While there has been shown and described preferred embodiments of the invention, it will be evident to those skilled in the art that various modifications may be made thereto without departing from the spirit and scope of the invention as is set forth in the appended claims.

What is claimed is:

1. A method for communicating the information contained in a plurality of serialized digital bit streams over a communication link comprising the steps of:
   grouping said plurality of serialized digital bit streams into at least one group having an odd number of bit streams per group;
   time division multiplexing the bits of each group together to form a single multiplexed bit stream from each group;
   demultiplexing said multiplexed bit streams into a first bit stream and a second bit stream of alternating bits from said multiplexed bit stream;
   modulating a first carrier with said first bit stream;
   modulating a second carrier of the same frequency which is 90° out of phase with said first carrier with said second bit stream; and
   transmitting said first and second carriers over a communication link.

2. A method for communicating digital data as set forth in claim 1 wherein steps of modulating said first and second carriers include:
   encoding the information as partial response data.

3. A method for communicating digital data as set forth in claim 1 wherein said step of grouping includes:
   grouping said plurality of serialized digital bit streams into at least one group having five bit streams per group.

4. An apparatus for minimizing error propagation in a quadrature partial response communication system having a plurality of channels, said apparatus comprising:

a demultiplexer which sequence bits from a plurality of channels having an odd number into pairs of quadrature phases I, Q;

a modulator for modulating the phases I, Q on the quadrature phases of a carrier to produce independent I, Q data streams;

a communication channel;

a quadrature partial response demodulator for receiving said I, Q data streams from said communication channel and demodulating said I, Q data streams; and multiplexer for multiplexing said I, Q data streams into the original bit sequence.

5. An apparatus for minimizing error propagation in a quadrature partial response communication system having a plurality of channels, said apparatus comprising:

a demultiplexer which sequence bits from a plurality of channels having an even number into pairs of quadrature phases I, Q;

means for inserting a spacing bit at the end of each sequence for the plurality of channels;

a modulator for modulating the phases I, Q on the quadrature phases of a carrier to produce independent I, Q data streams;

a communication channel;

a quadrature partial response demodulator for receiving said I, Q data streams from said communication channel and demodulating said I, Q data streams; and multiplexer for multiplexing said I, Q data streams into the original bit sequence.

* * * * *